US006747244B1

(12) United States Patent
Koide

(10) Patent No.: US 6,747,244 B1
(45) Date of Patent: Jun. 8, 2004

(54) LASER WORKING APPARATUS, LASER WORKING METHOD, METHOD FOR PRODUCING INK JET RECORDING HEAD UTILIZING SUCH LASER WORKING APPARATUS OR METHOD, AND INK JET RECORDING HEAD FORMED BY SUCH PRODUCING METHOD

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 09/722,644

(22) Filed: Nov. 28, 2000

(30) Foreign Application Priority Data

Nov. 30, 1999 (JP) ............................................ 11-339342
Nov. 30, 1999 (JP) ............................................ 11-339344

(51) Int. Cl.[7] .......................................... B23K 26/067
(52) U.S. Cl. ................................................. 219/121.71
(58) Field of Search ...................... 219/121.67, 121.68, 219/121.69, 121.7, 121.71, 121.72, 121.61, 121.74, 121.75, 121.77; 359/235; 427/140, 492, 555, 53.1

(56) References Cited

U.S. PATENT DOCUMENTS

| | | | | |
|---|---|---|---|---|
| 3,626,141 A | * | 12/1971 | Daly | 219/121.68 |
| 4,152,575 A | * | 5/1979 | Banas | 219/121.64 |
| 4,499,362 A | * | 2/1985 | Martin | 219/121.61 |
| 4,563,565 A | * | 1/1986 | Kampfer et al. | 219/121.69 |
| 4,727,234 A | * | 2/1988 | Oprysko et al. | 219/121.6 |
| 4,845,354 A | * | 7/1989 | Gupta et al. | 250/205 |
| 5,263,250 A | | 11/1993 | Nishiwaki et al. | 29/890.1 |
| 5,517,000 A | | 5/1996 | Nishiwaki et al. | 219/121.77 |
| 5,541,947 A | | 7/1996 | Nees | |
| 6,049,056 A | * | 4/2000 | Balamane et al. | 219/121.66 |
| 6,160,240 A | * | 12/2000 | Momma et al. | 219/121.85 |
| 6,339,208 B1 | * | 1/2002 | Rockstroh et al. | 219/121.71 |
| 6,528,758 B2 | * | 3/2003 | Shaffer | 219/121.68 |

FOREIGN PATENT DOCUMENTS

| | | |
|---|---|---|
| EP | 0 602 021 A2 | 6/1994 |
| JP | 2000-187146 | 7/2000 |
| JP | 2000-187464 | 7/2000 |
| JP | 2000-188333 | 7/2000 |
| JP | 2000187146 | 7/2001 |
| JP | 2001219282 | 8/2001 |
| JP | 2002052718 | 2/2002 |
| WO | WO 98/55035 | 12/1998 |

OTHER PUBLICATIONS

Office Action (in English) from counterpart application 126115.5–1262 in European Patent Office, dated Apr. 1, 2003, and citing the above–listed documents.

* cited by examiner

Primary Examiner—Tom Dunn
Assistant Examiner—Jonathan Johnson
(74) Attorney, Agent, or Firm—Fitzpatrick, Cella, Harper & Scinto

(57) ABSTRACT

The invention provides a laser working apparatus for effecting optical ablation working by irradiating a work article with laser light from a laser oscillator capable of continuous emission of light pulses of a large energy density in space and in time, with a pulse emission time not exceeding 1 picosecond, wherein control means for controlling the irradiation of the laser light is provided in a position not affecting the temperature control of the laser oscillating portion and a configuration is provided for controlling the irradiation of the laser light continuously emitted from the laser oscillator by the control means thereby effecting optical ablation working on the work article.

10 Claims, 3 Drawing Sheets

US 6,747,244 B1

LASER WORKING APPARATUS, LASER WORKING METHOD, METHOD FOR PRODUCING INK JET RECORDING HEAD UTILIZING SUCH LASER WORKING APPARATUS OR METHOD, AND INK JET RECORDING HEAD FORMED BY SUCH PRODUCING METHOD

BACKGROUND OF THE INVENTION

1. Field of the Invention

The present invention relates to a laser working apparatus, a laser working method, a method for producing an ink jet recording head utilizing such laser working apparatus or method, and an ink jet recording head produced by such producing method, and more particularly to a laser working apparatus and a laser working method capable of ablation working of a work article and of fine working of a complex material and a complex structure such as of a micromachine, an IC and a hybrid IC device.

2. Related Background Art

In case of forming a fine structure directly on a work article by laser light, there is generally employed a harmonic wave of an excimer laser or a YAG laser, but, since the energy density of the laser light in the oscillated pulse is limited to the order of 100 megawatts at maximum, the laser working is difficult in materials of high thermal conductivity such as metals, ceramics or minerals (such as silicon) or those of low light absorbance such as quartz or glass, and can only be applied for the sublimation ablation working principally of organic resinous materials. Because of such drawbacks, in case of fine working of a compound material including or composed of the aforementioned metals, ceramics, minerals or glass, the desired structure can only be formed by a lithographic process requiring steps of resist coating, resist patterning by exposure, resist development, etching utilizing the resist pattern and resist ashing for each of the different materials.

Also in the manufacture of an ink jet recording head which is generally provided, in the ink discharge mechanism, with an ink discharge orifice for discharging ink, a liquid chamber containing ink to be supplied to the ink discharge orifice, an ink flow path connecting the ink discharge orifice and the liquid chamber, an energy generating element provided in a part of the ink flow path for generating energy for ink discharge and an ink supply aperture for ink supply to the liquid chamber from the exterior, it is being tried to form the ink discharge orifice in a compound material including a laminated metal film in order to provide the plate bearing the ink discharge orifice (hereinafter called orifice plate) with a function not achievable with a resinous material only. In such case there is applied press working process or lithographic pattern etching process, but the press working is limited in the precision and is unsuitable for fine working. Also the etching process is disadvantageous in cost because of the complex working process, and also in the significant investment required for the production facility, in consideration of the process tact time.

As explained in the foregoing, there is generally required a complex working process such as the lithographic process, in order to form a fine structure in the work article.

Therefore, the present applicant already proposed, for example in the Japanese Patent Applications Nos. 2000-187464, 2000-188333 and 2000-187146, means utilizing so-called femtosecond laser described for example in the "Next Generation Optotechnology Review" (published 1992 by Optronics Co.; Part 1 Elementary Technology; Generation and compression of ultra short light pulse, pp.24–31) and executing irradiation with the laser light in plural pulses of a high energy density in space and in time, emitted from a laser oscillator having a pulse emission time not exceeding 1 picosecond, in concentrated manner with a predetermined energy density, thereby achieving sublimation ablation working before the laser light is diffused as thermal energy in the work article. With such means, since the energy density in time is drastically increased (a pulse emission time not exceeding 150 femtoseconds and an optical energy exceeding 500 microjoules per pulse being achievable in the commercially available femtosecond lasers, thus providing an energy density of about 3 gigawatts in the oscillated pulse of the emitted laser light), and since the laser irradiation time is very short, the sublimation ablation working process can be completed before the laser light is diffused as thermal energy in the work article. Such phenomenon may be scientifically interpreted that the optical energy is not converted into thermal energy but directly functions as the lattice cleaving energy because the photons require a time of about 1 picosecond for conversion into phonons or thermal quantum particles by absorption in the electrons.

Such phenomenon allows to concentrate energy even in materials of high thermal conductivity such as metals, ceramics or minerals (for example silicon) thereby easily achieving the working by a multi-photon absorbing process, and the working becomes possible even in materials of low light absorbance such as glass, quartz or optical crystals as long as they have an absorbance of 0.1 to 1%, since, even in such materials, the optical energy density reaches a gigawatt level which is more than 100 times higher than that achievable with the excimer laser.

Consequently the optical ablation working, utilizing the high output femtosecond laser capable of emitting a high power laser light with a pulse emission time not exceeding 1 picosecond, is highly promising as the fine working process not limited in the material, and is therefore actively developed in recent years.

However, the above-mentioned laser oscillation system, capable of emitting the laser light with a pulse emission time not exceeding 1 picosecond, generally employs vertical mode synchronization for oscillation, and the compression of the laser pulse in time is realized by the vertical mode synchronization, which requires adjustment of an optical member in the laser system in the order of a micrometer. For this reason, the system is very sensitive to the thermal expansion or contraction of the members constituting the system, and, if the repeated oscillation state of the laser is changed for example by a burst oscillation or a modulation of the repeated oscillation frequency, the thermal equilibrium in the laser oscillator is perturbed to cause instability of the temperature therein, whereby the support member for the optical members causes thermal expansion or contraction to disrupt the optical adjustment of the micrometer order, thereby resulting in a variation in the oscillated pulse duration and the output energy of the laser light. In order to avoid such drawbacks, the above-mentioned laser oscillation system is operated under temperature control of the order of 0.1° C. for the portions of laser oscillation and amplification, but such temperature control is still insufficient and it is still desirable to operate the system in a continuous pulse oscillation mode in a stationary state.

On the other hand, in case of using such continuous pulse oscillation mode for actual working process, a light intercepting device or a light intensity attenuating device has to be provided in the optical path of the continuously emitted laser light, but such device, if simply provided in the laser oscillator, results in the following drawbacks.

As explained in the foregoing, since the laser emission of the extremely short pulse emission time is achieved by the vertical mode synchronization, the optical members in the laser oscillation system have to be positioned with a precision of the order of a micrometer, and the entire laser oscillator is precisely controlled in temperature with a precision of the order of 0.1° C. If a light intercepting device or a light intensity attenuating device is simply provided in the main body of such laser oscillator, such device absorbs or emits the energy of the laser, whereby the temperature in the laser oscillator is elevated by the absorption of the optical energy and the laser oscillation itself becomes extremely unstable.

Also, for achieving optimum fine working with a higher precision, it is not sufficient to merely consider the influence on the temperature control of the entire laser oscillating portion, in providing the light intercepting device or the like therein. For achieving optimum fine working with a higher precision by the optical ablation working, the burst irradiation of the laser light in continuous pulses of a constant frequency is not sufficient but it is also required to vary the repeating frequency of the laser light pulses or to vary the ratio in time of the laser irradiating state and the laser non-irradiating state, according to the physical characteristics of the work article, the structure to be formed or the proceeding of working. More specifically it is required to optimize the interval of laser irradiations or to avoid the change in the ablating characteristics resulting from the shielding and absorption of the light by the plasma cloud, according to the scattered state of the plasma, atomic and molecular particles generated by the optical ablation. However, if the oscillation frequency of the laser light pulses from the laser oscillation system constituting the light source is directly modulated, there results the aforementioned drawback that the thermal equilibrium is perturbed to alter the characteristics of the laser light.

In consideration of the foregoing, the object of the present invention is to provide a laser working apparatus and a laser working method capable of controlling the irradiation with the laser light continuously emitted from the laser oscillator without affecting the temperature control of the entire laser oscillating portion, thereby achieving desired optical ablation working, also a producing method for an ink jet recording head utilizing such laser working apparatus or method, and an ink jet recording head obtained by such producing method.

SUMMARY OF THE INVENTION

The above-mentioned object can be attained, according to the present invention, by a laser working apparatus, a laser working method, a producing method for an ink jet recording head utilizing such laser working apparatus or method, and an ink jet recording head obtained by such producing method, featured by the following configurations (1) to (30):

(1) A laser working apparatus for effecting optical ablation working by irradiating a work article with laser light from a laser oscillator capable of continuous emission of a light pulse of a large energy density in space and in time, with a pulse emission time not exceeding 1 picosecond;

wherein control means for controlling the irradiation of the laser light is provided in a position not affecting the temperature control of the laser oscillating portion and a configuration is provided for controlling the irradiation of the laser light continuously emitted from the laser oscillator by the control means thereby effecting optical ablation working on the work article.

(2) A laser working apparatus according to (1), wherein the control means is provided outside the laser oscillator or in a chamber separate from a laser oscillation chamber in the laser oscillator.

(3) A laser working apparatus according to (1) or (2), wherein the control means is a light intercepting device capable of transmitting or intercepting the laser light, and a configuration is provided for irradiating the work article with a predetermined number of pulses by the light intercepting device thereby achieving optical ablation working.

(4) A laser working apparatus according to (3), wherein the light intercepting device is arranged by a mechanical electromagnetic chopper.

(5) A laser working apparatus according to (3), wherein the light intercepting device is arranged by an electrical liquid crystal shutter.

(6) A laser working apparatus according to (3), wherein the light intercepting device achieves interception of light by a diffraction effect in an acoustooptical modulator (AOM).

(7) A laser working apparatus according to (3), wherein the light intercepting device achieves interception of light by a diffraction effect in an electrooptical modulator (EOM).

(8) A laser working apparatus according to (1), wherein the control means is light intensity attenuating means capable of controlling the attenuation of the intensity of the laser light, and a configuration is provided for irradiating the work article with a predetermined energy density by the light intensity attenuating means.

(9) A laser working apparatus according to (8), wherein the light intensity attenuating means is arranged by a variable light attenuator for controlling the intensity of the transmitting light by varying the incident angle of light.

(10) A laser working apparatus according to (8), wherein the light intensity attenuating means is arranged by a light absorbing filter.

(11) A laser working apparatus according to (1) or (2), wherein the control means is a light interception control device capable of repeating the transmission and interception of the transmitting light with a frequency smaller (or a period longer) than that of the consecutive light pulses emitted from the laser oscillator, and a configuration is provided for irradiating the work article with the consecutive light pulses at a predetermined interval by the light interception control device, thereby achieving optical ablation working.

(12) A laser working apparatus according to (11), wherein the light interception control device is arranged by a mechanical rotary chopper.

(13) A laser working apparatus according to (12), wherein the time ratio of transmission and interception of the light by the mechanical rotary chopper is set by the shape of a shielding plate of the mechanical rotary chopper.

(14) A laser working apparatus according to (11), wherein the light interception control device is arranged by an electromagnetically controlled mechanical shutter.

(15) A laser working apparatus according to (11), wherein the light interception control device is arranged by an electrical liquid crystal shutter.

(16) A laser working apparatus according to (11), wherein the light interception control device executes interception of the light utilizing the diffraction effect of an acoustooptical modulator (AOM).

(17) A laser working apparatus according to (11), wherein the light interception control device executes interception of the light utilizing the diffraction effect of an electrooptical modulator (EOM).

(18) A laser working apparatus according to (11), wherein the temperature increase of the light interception control device by the absorption of the laser light is prevented by air cooling means such as an air blower or by liquid cooling means such as a circulating liquid heat exchanger.

(19) A laser working apparatus according to (11), wherein the laser light reflected by the light interception control device is absorbed by a light absorbing material such as a carbon block.

(20) A laser working apparatus according to (11), wherein the repeating period of transmission and interception of the light by the light interception control device is controlled by the electrical or mechanical control of the light interception control device by controller means.

(21) A laser working apparatus according to (20), wherein the controller means is adapted to variably control the repeating period of transmission and interception of the light of the light interception control device, according to the physical properties of the work article and the shape thereof to be worked, or according to the state of progress of the working.

(22) A laser working apparatus according to (20), wherein the controller means is adapted to variably control the time ratio of transmission and interception of the light of the light interception control device, according to the physical properties of the work article and the shape thereof to be worked, or according to the state of progress of the working.

(23) A laser working apparatus according to (1), wherein the laser oscillator is provided with a spatial compression device for light propagation.

(24) A laser working apparatus according to (23), wherein the spatial compression device for light propagation is arranged by chirping pulse generation means and vertical mode synchronization means utilizing the optical wavelength dispersion characteristics.

(25) A laser working method for effecting optical ablation working by irradiating a work article with laser light from a laser oscillator capable of continuous emission of light pulses of a large energy density in space and in time, with a pulse emission time not exceeding 1 picosecond;
wherein the temperature of an area including the laser oscillator is controlled, and control means is provided, outside the temperature control area, on the optical axis of the laser light for controlling the irradiation of the laser light continuously emitted from the laser oscillator thereby effecting optical ablation working on the work article.

(26) A laser working method according to (25), wherein the control means is arranged by a light intercepting device capable of transmitting or intercepting the laser light, and the light intercepting device irradiates the work article with a predetermined number of pulses thereby achieving optical ablation working.

(27) A laser working method according to (25), wherein the control means is arranged by light intensity attenuating means capable of controlling the attenuation of the intensity of the laser light, and the light intensity attenuating means irradiates the work article with a predetermined energy density thereby achieving optical ablation working.

(28) A laser working method according to (25), wherein the control means is arranged by a light interception control device capable of repeating the transmission and interception of the transmitting light with a frequency smaller (or a period longer) than that of the consecutive light pulses emitted from the laser oscillator, and the light interception control device irradiates the work article with the consecutive light pulses at a predetermined interval, thereby achieving optical ablation working.

(29) A method for producing an ink jet recording head provided with an ink discharge orifice for discharging an ink droplet to be deposited on a recording medium, a liquid chamber for storing ink to be supplied to the discharge orifice, an ink flow path connecting the discharge orifice and the liquid chamber, an energy generating element provided in a part of the ink flow path and adapted to generate energy for discharging ink, an ink supply aperture for supplying the liquid chamber with the ink from the exterior etc., by working a member constituting at least a part of the ink flow path by a laser working apparatus;
wherein a member constituting at least a part of the ink flow path is sublimatedly worked by using the laser working apparatus according to either one of (1) to (24) or the laser working method according to either one of (25) to (28).

(30) An ink jet recording head provided with an ink discharge orifice for discharging an ink droplet to be deposited on a recording medium, a liquid chamber for storing ink to be supplied to the discharge orifice, an ink flow path connecting the discharge orifice and the liquid chamber, an energy generating element provided in a part of the ink flow path and adapted to generate energy for discharging ink, an ink supply aperture for supplying the liquid chamber with the ink from the exterior etc., in which a member constituting at least a part of the ink flow path is formed by a laser working apparatus;
wherein the ink jet recording head is produced by the producing method according to (29).

The present invention provides a laser working apparatus and a laser working method capable of achieving desired optical ablation working by controlling the irradiation of the laser light continuously emitted from the laser oscillator, without affecting the temperature control of the entire laser oscillating portion, and a method for producing an ink jet recording head utilizing such laser working apparatus or method and an ink jet recording head produced by such producing method.

Also the present invention provides a laser working apparatus and a laser working method capable of achieving precise laser working of predetermined depth and shape by irradiating the work article with a predetermined number of pulses by controlling the transmission and interception of the laser light, under stable laser oscillation and without affecting the temperature control of the entire laser oscillating portion, and a method for producing an ink jet recording head utilizing such laser working apparatus or method and an ink jet recording head produced by such producing method.

Also the present invention provides a laser working apparatus and a laser working method capable of achieving precise laser working with a smooth worked surface by irradiating the work article with a predetermined energy density by controlling the intensity of the laser light, under stable laser oscillation and without affecting the temperature control of the entire laser oscillating portion, and a method for producing an ink jet recording head utilizing such laser working apparatus or method and an ink jet recording head produced by such producing method.

Also the present invention provides a laser working apparatus and a laser working method capable of optimizing the interval of laser irradiation in consideration of the scattered state of the plasma and gaseous atoms or molecules generated by the optical ablation and avoiding the variation in the ablating characteristics resulting from the light interception and absorption by the plasma cloud, thereby achieving optimum laser working of high precision by controlling the repeating period of the laser light pulses or the time ratio of laser irradiating state and laser non-irradiating state according to the physical properties and work shape of the work article or the state of progress of working, without affecting the temperature control of the entire laser oscillating portion, and a method for producing an ink jet recording head utilizing such laser working apparatus or method and an ink jet recording head produced by such producing method.

DETAILED DESCRIPTION OF THE PREFERRED EMBODIMENTS

Figure 1:
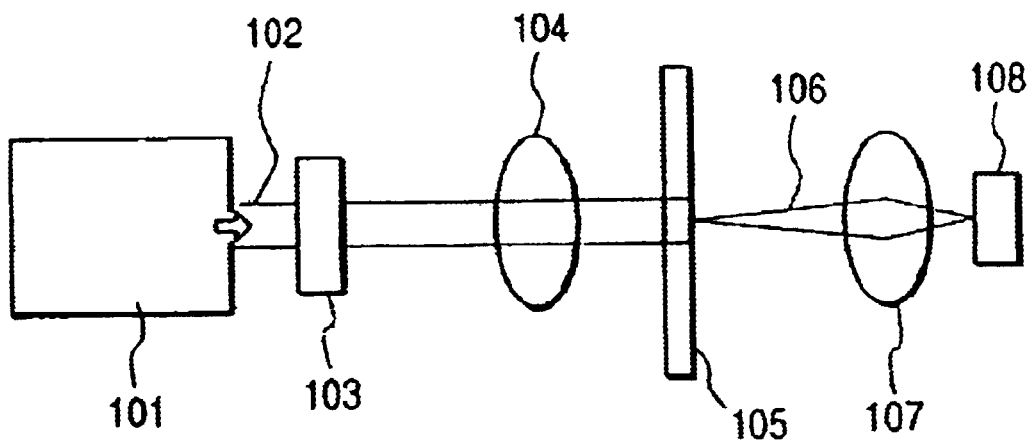
FIG. 1 is a schematic view showing the optical configuration of a laser working apparatus constituting an example 1 of the present invention.

In a first embodiment of the present invention, the control means for controlling the laser light irradiation is arranged by a light intercepting device, which is provided in a position not affecting the temperature control of the aforementioned laser oscillating portion, whereby the transmission and interception of the laser light, continuously emitted from the laser oscillator, can be controlled without generating heat from the optical energy in the laser oscillating portion. It is thus rendered possible to control the transmission and interception of the light under stable laser oscillation, without affecting the temperature control of the entire laser oscillating portion, and to irradiate the work article with a predetermined number of pulses thereby achieving precise laser working of a predetermined depth.

In a second embodiment of the present invention, the control means for controlling the laser light irradiation is arranged by light intensity attenuating means, which is provided in a position not affecting the temperature control of the aforementioned laser oscillating portion, whereby the intensity of the laser light, continuously emitted from the laser oscillator, can be attenuated without generating heat from the optical energy in the laser oscillating portion. It is thus rendered possible to attenuate the intensity of the light under stable laser oscillation, without affecting the temperature control of the entire laser oscillating portion, and to irradiate the work article with a predetermined energy density thereby achieving precise laser working with a smooth worked surface.

In a third embodiment of the present invention, a light interception control device capable of controlling the repetition of transmission and. interception of the transmitting light at a frequency smaller than that of the consecutive light pulses emitted from the laser oscillator is provided in a position not affecting the temperature control of the aforementioned laser oscillating portion, whereby the repeating period of the laser light pulses or the time ratio of the laser irradiating state and laser non-irradiating state can be controlled according to the physical properties and work shape of the work article or the state of progress of the working, without affecting the temperature control of the entire laser oscillating portion, thereby achieving highly precise optimum fine laser working. A direct modulation of the oscillation frequency of the laser light pulses in the laser oscillation system, constituting the light source, will result in a change in the characteristics of the laser light, resulting from a perturbation in the thermal equilibrium state. However, a similar effect can be obtained in pseudo manner by varying the repeating period of the transmission and interception of light in the light interception control device or by varying the time ratio of the transmission and interception of the light in the light interception control device, as explained in the foregoing.

In the following, examples of the present invention will be explained with reference to the accompanying drawings. The examples 1, 2 and 3 respectively correspond to the aforementioned first, second and third embodiments.

EXAMPLE 1

FIG. 1 is a schematic view showing the optical path of the optical system of a laser working apparatus in the example 1 of the present invention.

There are shown a short pulse laser oscillator 101, a mask illuminating optical system 104 including a field lens, a condenser lens etc. (including other illuminating methods such as Koehler illuminating system and critical illuminating system), a photomask 105, a projection imaging lens 107, and a work article 108.

In the above-mentioned optical system, a laser light beam 102 emitted from the short pulse laser oscillator 101 in a direction indicated by an arrow illuminates the photomask 105 by means of the mask illuminating optical system 104 including a field lens, a condenser lens etc. (including other illuminating methods such as Koehler illuminating system, critical illuminating system etc.). A laser light beam 106 transmitted by a mask pattern formed on the photomask 105 is focused and projected by the projection imaging lens 107, onto the work article 108, which is thus worked by the laser oscillation.

The laser oscillator emitting the laser light with a pulse oscillation time not exceeding 1 picosecond, adapted for use in such laser working apparatus, is a laser oscillator utilizing the vertical mode synchronization. The laser pulses from such laser oscillator are generally emitted in consecutive manner. Therefore, in order to control the irradiation to a predetermined number of pulses, the present example employs a light intercepting device 103 capable of controlling the transmission and interception of light, positioned in the optical path of the laser light beam 102 emitted from the laser oscillator 101 but in a position not affecting the temperature control of the entire laser oscillating portion such as outside the laser oscillator or in a chamber separate from a laser oscillating chamber in the laser oscillator, and the work article is worked by a predetermined amount by on/off control wherein the light transmitting state and the light non-transmitting state are respectively taken as "on" and "off". The aforementioned position not affecting the temperature control of the entire laser oscillating portion is preferably between the laser oscillator 101 and the optical system in the optical path of the aforementioned optical system, and more preferably in the vicinity of the laser light exit of the laser oscillator 101.

The timing of shuttering operation of such device may be controlled by counting the number of pulses or the time.

The present example employs an electromagnetic mechanical shutter of chopper type as the light intercepting device mentioned above.

However, in order to realize a short operation time that is not achievable with such mechanical shutter, it is also possible to turn on and off the light interception for example by an electrically controlled liquid crystal shutter, or an acoustooptical modulator (AOM) element or an electrooptical modulator (EOM) element for changing the proceeding direction of light between an "on" state in which the light proceeds straight and an "off" state in which the light is deflected by the optical diffraction effect. However, the laser pulse not exceeding 1 picosecond, generally oscillated by multiple vertical mode, is associated with a spread laser wavelength head. For this reason, there is encountered a drawback that the laser pulse width is somewhat elongated upon passing a bulk optical element because of the wavelength dispersion characteristics thereof.

Also in case of multiple work articles, namely in case of application to mass production, the stability of the pulse duration and the output energy, which are the oscillation characteristics of the laser, are very important. It therefore becomes essential, as in the present example, to turn on and off the laser irradiation by positioning the light intercepting device in a part of the optical path not affecting the temperature control of the laser oscillating portion.

EXAMPLE 2

Figure 2:
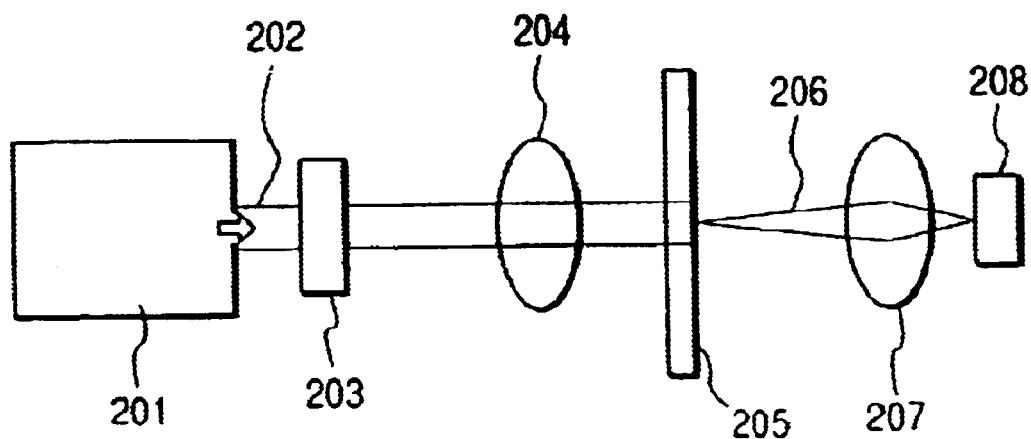
FIG. 2 is a schematic view showing the optical configuration of a laser working apparatus constituting an example 2 of the present invention.

FIG. 2 is a schematic view showing the optical path of the optical system of a laser working apparatus in the example 2 of the present invention.

There are shown a short pulse laser oscillator 201, a mask illuminating optical system 204 including a field lens, a condenser lens etc. (including other illuminating methods such as Koehler illuminating system and critical illuminating system), a photomask 205, a projection imaging lens 207, and a work article 208.

In the above-mentioned optical system, a laser light beam 202 emitted from the short pulse laser oscillator 201 in a direction indicated by an arrow illuminates the photomask 205 by means of the mask illuminating optical system 204 including a field lens, a condenser lens etc. (including other illuminating methods such as Koehler illuminating system, critical illuminating system etc.). A laser light beam 206 transmitted by a mask pattern formed on the photomask 205 is focused and projected, by the projection imaging lens 207, onto the work article 208, which is thus worked by the laser oscillation.

The laser oscillator emitting the laser light with a pulse oscillation time not exceeding 1 picosecond, adapted for use in such laser working apparatus, is a laser oscillator utilizing the vertical mode synchronization. The laser pulse energy from such laser oscillator is generally constant. Therefore, in order to control the irradiation to a predetermined light intensity, the present example employs light intensity attenuating means 203 in the optical path of the laser light beam 202 emitted from the laser oscillator 201 but in a position not affecting the temperature control of the entire laser oscillating portion such as outside the laser oscillator or in a chamber separate from a laser oscillating chamber in the laser oscillator, and the work article is worked in optimum manner by the control of the irradiating light intensity at the optimum level. The aforementioned position not affecting the temperature control of the entire laser oscillating portion is preferably between the laser oscillator 201 and the optical system in the optical path of the aforementioned optical system, and more preferably in the vicinity of the laser light exit of the laser oscillator 201.

In the present example, the light intensity attenuating means is arranged by a variable attenuator. Naturally it may also be arranged by a light absorbing filter or a simple optical attenuator.

However, the laser pulse not exceeding 1 picosecond, generally oscillated by multiple vertical mode, is associated with a spread laser wavelength band. For this reason, there is encountered a drawback that the laser pulse width is somewhat elongated upon passing a bulk optical element because of the wavelength dispersion characteristics thereof.

Also in case of multiple work articles, namely in case of application to mass production, the stability of the pulse duration and the output energy, which are the oscillation characteristics of the laser, are very important. It therefore becomes essential, as in the present example, to position the light intensity attenuating means in a part of the optical path not affecting the temperature control of the laser oscillating portion.

EXAMPLE 3

Figure 3:
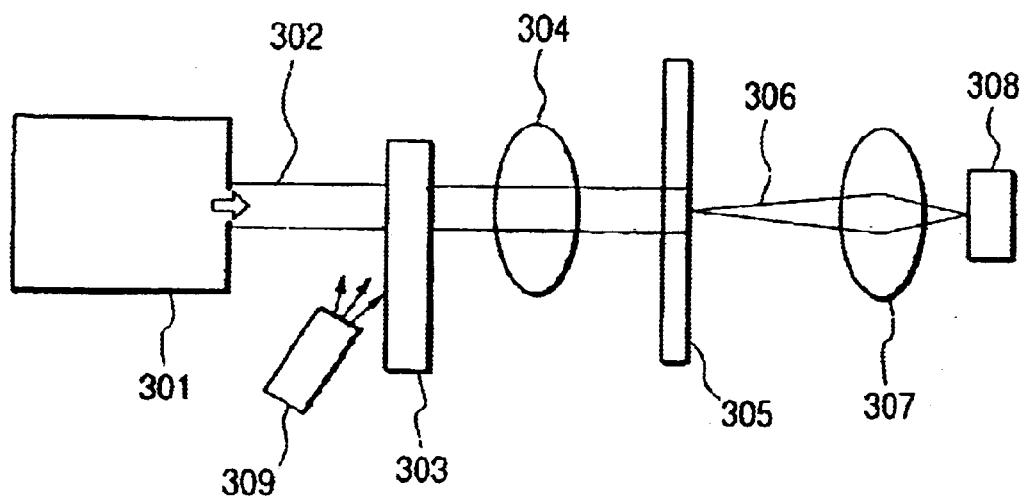
FIG. 3 is a schematic view showing the optical configuration of a laser working apparatus constituting an example 3 of the present invention.

FIG. 3 is a schematic view showing the optical path of the optical system of a laser working apparatus in the example 3 of the present invention.

Referring to FIG. 3, a laser light beam 302 emitted from a short pulse laser oscillator 301 in a direction indicated by an arrow illuminates a photomask 305 by means of a mask illuminating optical system 304 including a field lens, a condenser lens etc. (including other illuminating methods such as Koehler illuminating system, critical illuminating system etc.). A laser light beam 306 transmitted by a mask pattern formed on the photomask 305 is focused and projected, by a projection imaging lens 307, onto a work article 108, which is thus worked by the laser oscillation.

Figure 4:
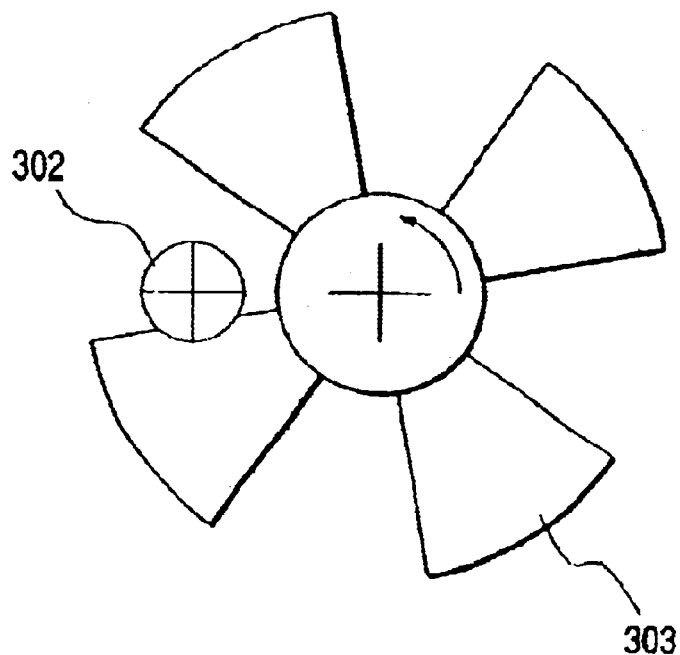
FIG. 4 is a schematic view of a rotary chopper in the example 3 of the present invention.

The laser oscillator emitting the laser light with a pulse oscillation time not exceeding 1 picosecond, adapted for use in such laser working apparatus, executes compression of the optical pulse time, utilizing the vertical mode synchronization, and the pulses are emitted in continuous manner with a fixed period as explained in the foregoing, with an oscillation frequency of about 1 kHz in the commercially available laser oscillators. Therefore, in the present example, a light interception control device is arranged by a rotary chopper 304 positioned in the optical path of the laser light beam 302 emitted from the laser oscillator 301, and a rotary disk shaped as a windmill as shown in FIG. 4 is rotated in a direction indicated by an arrow under the control of the rotating speed by unrepresented motor and controller, thereby controlling the cycle time of transmission and interception of the laser light from several Hertzs to a value slightly less than the oscillation frequency of the laser oscillator. The time ratio of light transmission and interception is determined by the windmill shape of the chopper.

Portions of the rotary chopper 303 constituting the light interception control device, receiving the irradiation by the laser light, are coated in a color showing a high absorbance to the wavelength of the laser light, whereby, when in the light-intercepting state, the laser light is absorbed by the chopper member and converted into thermal energy. Since the laser beam is spread spatially, the irradiation energy density of the laser light does not reach the ablating threshold, whereby the optical energy does not cause ablation working but is merely converted into thermal energy, so that the chopper is not damaged. Also the heated rotary chopper 303 is cooled by blowing air or nitrogen gas from a gas blower 309.

In case the laser light is partially reflected in the light-intercepting state, certain measures have to be provided for dealing with such reflected light, though such measures are not illustrated. The reflected light is finally absorbed by a light absorbing material such as carbon.

Also in case the light-intercepting state is realized by deflecting the light by reflection, the deflecting reflective plate has to be inclined from a state perpendicular to the optical axis of the laser light in order that the reflected light does not return to the laser oscillator, and the reflected light has to be finally absorbed by a light absorbing material such as carbon.

In terminating the optical ablation working, the rotary chopper 303 constituting the light interception control device can be stopped in the light-intercepting state.

In the present example, the light interception control device is arranged by a repeating mechanical shutter such as the rotary chopper, but it may also be arranged by an electromagnetically controlled mechanical shutter, or, in order to realize a short operation time that is not achievable with such mechanical shutter, it is also possible to turn on and off the light interception for example by an electrically controlled liquid crystal shutter, or an acoustooptical modulator (AOM) element or an electrooptical modulator (EOM) element for changing the proceeding direction of light between an "on" state in which the light proceeds straight and an "off" state in which the light is deflected by the optical diffraction effect. In such case, the cycle time of light transmission and interception, and the time ratio of transmission and interception of the laser light can be controlled by controller means for the shutter.

However, the laser pulse not exceeding 1 picosecond, generally oscillated by multiple vertical mode, is associated with a spread laser wavelength band. For this reason, there is encountered a drawback that the laser pulse width is somewhat elongated upon passing a bulk optical element, because of the wavelength dispersion characteristics thereof. It is therefore necessary to incorporate correction means, for example utilizing the abnormal wavelength dispersion characteristics, in the optical system.

Also in case of multiple work articles, namely in case of application to mass production, the stability of the pulse duration and the output energy, which are the oscillation characteristics of the laser, are very important. It therefore becomes essential, as in the present example, to position the light interception control device in a part of the optical path not affecting the temperature control of the laser oscillating portion, thereby controlling the time ratio of transmission and interception of the laser light. The light interception control device may be provided in any position in the optical path of the aforementioned optical system, but is preferably provided in a position where the laser beam becomes a parallel beam, between the laser oscillator 301 and the aforementioned optical system.

Figure 5:
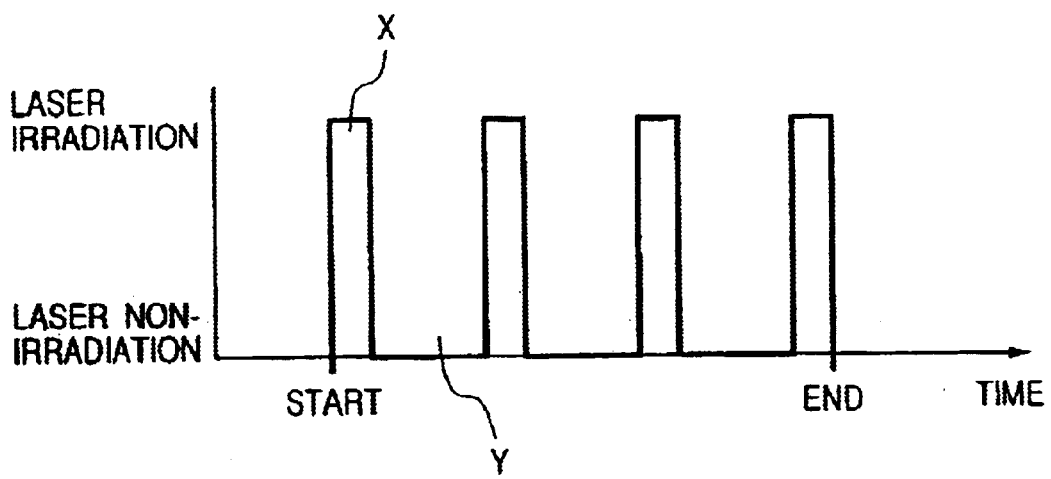
FIG. 5 is a view showing the sequence of laser irradiating method of the example 3 of the present invention.

The laser working process basically assumes a sequence as shown in FIG. 5, in which an irradiating state X and a non-irradiating state Y are repeated by a train of laser pulses. There is however provided a configuration for achieving precise and optimum optical ablation working by modulating the repeating period of the laser light pulses or modulating the time ratio of the irradiating state and non-irradiating state of the laser light pulses according to the physical properties and work shape of the work article and the state of progress of working.

Figure 6A:
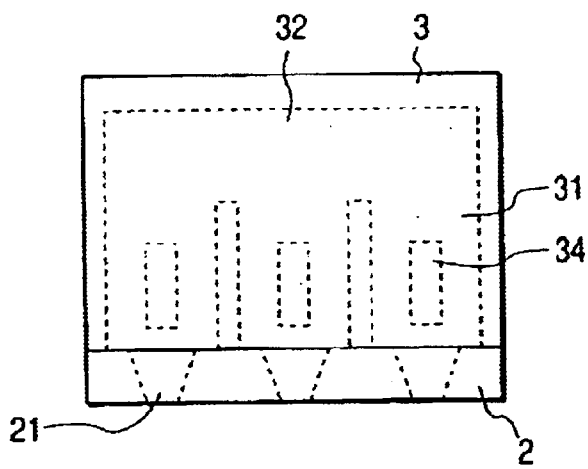
FIGS. 6A, 6B and 6C are schematic views showing an ink jet recording head produced by a producing method embodying the present invention.
Figure 6B:
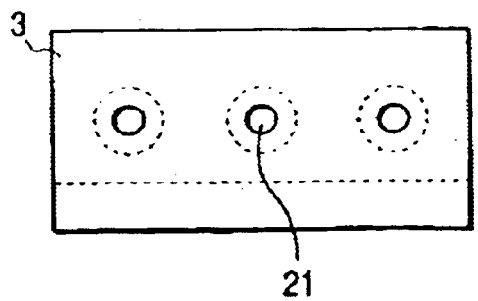
Figure 6C:
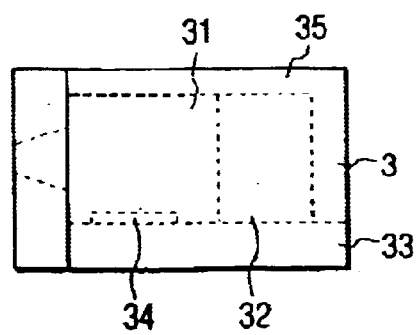

FIGS. 6A, 6B and 6C show an ink jet recording head, worked by the laser working apparatus of the examples 1 to 3.

Referring to FIGS. 6A to 6C, a substrate 33 bears an ink discharge pressure generating element 34 for discharging ink, such as an electrothermal converting element or an electromechanical converting element. The ink discharge pressure generating element 34 is provided in an ink flow path 31 communicating with a discharge orifice 21, and the ink flow paths 31 communicate with a common liquid chamber 32, connected to an ink supply pipe (not shown) for ink supply from an ink tank.

A top plate 35 is provided with recesses for forming the ink flow path 31 and the common liquid chamber 32, and is adjoined to the substrate 33 for forming the ink flow path 31 and the common liquid chamber 32.

On the adjoined body of the substrate 33 and the top plate 35, at an end of the ink flow paths, there is provided an orifice plate 2 having a discharge orifice 21.

Such ink jet recording head can be prepared in the following manner.

At first the substrate 33 is prepared by patterning a heater 34, constituting the heat generating resistor element for generating the ink discharge pressure, an integrated circuit such as shift registers, and electric wirings on a silicon substrate. Also the top plate 35 is prepared by forming recesses for constituting the ink flow path 31 and the common liquid chamber 32 and an ink supply aperture (not shown) by patterned projection of light pulses of predetermined numbers from the aforementioned laser working apparatus.

Then the substrate 33 and the top plate 35 are mutually aligned and adjoined in such a manner that the end faces at the ink discharge side as well as the ink flow paths 31 and the heaters 34 mutually match. Then the orifice plate 2 in which the orifices are not yet formed is adjoined to the end face, at the ink discharge side, of the adjoined body of the top plate and the substrate, and, in such state, the orifices 21 are formed by patterned irradiation with the light pulses of predetermined numbers by the aforementioned laser working apparatus. Thereafter the ink jet recording head is completed by connecting an electric circuit board on which heater driving terminals are patterned, adjoining an aluminum base plate to the substrate 33, and connecting a holder for holding various members and an ink tank for ink supply.

What is claimed is:

1. A laser working apparatus for effecting optical ablation working by irradiating a work article with a laser light with a pulse emission time not exceeding 1 picosecond from a laser oscillator capable of continuos emission of a light pulse of a large energy density in space and in time, with the pulse emission time not exceeding 1 picosecond, the laser working apparatus for effecting optical ablation working comprising:

a light intercepting control means, disposed in a light path of laser light with the pulse emission time not exceeding 1 picosecond from the laser oscillator to the work article, for selecting a state where the laser light with the pulse emission time not exceeding 1 picosecond can be irradiated to irradiate the work article or a light intercepting state where the laser light with the pulse emission time not exceeding 1 picosecond cannot be irradiated to the work article, wherein said light intercepting control means is heated by receiving irradiation of laser light with the pulse emission time not exceeding 1 picosecond at the light intercepting state, wherein the laser light, irradiating to and absorbed by said light intercepting control means, with the pulse emission time not exceeding 1 picosecond does not reach an ablation threshold value of energy density at which the work article is worked.

2. A laser working apparatus according to claim 1, wherein said light intercepting control means is provided outside the laser oscillator or in a chamber separate from a laser oscillation chamber in the laser oscillator.

3. A laser working apparatus according to claim 1 or 2, wherein said light intercepting control means comprises a light intercepting device capable of transmitting or intercepting laser light, and a configuration is provided for irradiating the work article with a predetermined number of pulses by the light intercepting device thereby effecting optical ablation working.

4. A laser working apparatus according to claim 3, wherein the light intercepting device is arranged by an electromagnetic mechanical chopper.

5. A laser working apparatus according to claim 1 or 2, wherein said light intercepting control means is arranged by a light interception control device capable of repeating the transmission and interception of the transmitting light with a frequency smaller (or a period longer) than that of the consecutive light pulses emitted from the oscillator, and a configuration is provided for irradiating the work article with the consecutive light pulses at a predetermined interval by the light interception control device, thereby effecting optical ablation working.

6. A laser working apparatus according to claim 5, wherein the light interception control device is arranged by a mechanical rotary chopper.

7. A laser working apparatus according to claim 6, wherein the time ratio of transmission and interception of the light by the mechanical rotary chopper is set by the shape of a shielding plate of the mechanical rotary chopper.

8. A laser working apparatus according to claim 1, wherein the light path reaches the work article from the laser oscillator through a photomask illuminating optical system, a photomask and a photomask pattern projection imaging lens, and wherein said light intercepting control means is disposed between the laser oscillator and the photomask illuminating optical system.

9. A laser working apparatus according to claim 1, wherein said light intercepting control means is provided with cooling means for cooling a portion heated by receiving irradiation of laser light with the pulse emission time not exceeding 1 picosecond at the light intercepting state.

10. A laser working apparatus according to claim 9, wherein the cooling means is a gas blowing member for blowing gas to the heated portion.

* * * * *

UNITED STATES PATENT AND TRADEMARK OFFICE
CERTIFICATE OF CORRECTION

PATENT NO. : 6,747,244 B1
DATED : June 8, 2004
INVENTOR(S) : Jun Koide

It is certified that error appears in the above-identified patent and that said Letters Patent is hereby corrected as shown below:

Column 8,
Line 3, "and." should read -- and --.

Column 10,
Line 17, "mode," should read -- modes, --.

Column 11,
Line 43, "mode," should read -- modes, --.

Column 12,
Line 59, "continuos" should read -- continuous --.

Signed and Sealed this

Twenty-first Day of December, 2004

JON W. DUDAS
*Director of the United States Patent and Trademark Office*